United States Patent
Kilroy et al.

(10) Patent No.: US 10,193,331 B2
(45) Date of Patent: Jan. 29, 2019

(54) POWER DISTRIBUTION UNIT AND METHOD OF CONTAINING ARC FAULTS IN POWER DISTRIBUTION UNITS

(71) Applicant: Hamilton Sundstrand Corporation, Charlotte, NC (US)

(72) Inventors: Donald G. Kilroy, Rockford, IL (US); Robert C. Cooney, Janesville, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 476 days.

(21) Appl. No.: 14/957,938

(22) Filed: Dec. 3, 2015

(65) Prior Publication Data

US 2017/0163028 A1    Jun. 8, 2017

(51) Int. Cl.
*H02H 7/22* (2006.01)
*H02B 1/18* (2006.01)
*H02H 1/00* (2006.01)
*H02H 7/26* (2006.01)
*H01H 83/20* (2006.01)

(52) U.S. Cl.
CPC .............. *H02H 7/22* (2013.01); *H02B 1/18* (2013.01); *H02H 1/0015* (2013.01); *H02H 1/0023* (2013.01); *H01H 2083/201* (2013.01); *H02H 7/261* (2013.01)

(58) Field of Classification Search
CPC ...... H02H 7/22; H02H 1/0015; H02H 1/0023; H02H 7/261; H02B 1/18; H01H 2083/201
See application file for complete search history.

(56) References Cited

U.S. PATENT DOCUMENTS

| | | | | |
|---|---|---|---|---|
| 4,599,679 A | * | 7/1986 | Baader | H01H 85/2035 337/198 |
| 4,842,534 A | * | 6/1989 | Mobley | H01H 85/2035 337/191 |
| 5,474,475 A | * | 12/1995 | Yamaguchi | H01H 85/2035 439/212 |
| 5,966,281 A | * | 10/1999 | Larson | H01H 71/123 361/103 |
| 7,499,262 B1 | | 3/2009 | Darr | |
| 7,918,690 B2 | | 4/2011 | Yaworski et al. | |
| 8,755,159 B2 | | 6/2014 | Billod | |
| 8,987,948 B2 | | 3/2015 | Simper et al. | |

(Continued)

FOREIGN PATENT DOCUMENTS

| | | |
|---|---|---|
| DE | 102014004912 A1 | 10/2015 |
| EP | 2608340 A1 | 6/2013 |

OTHER PUBLICATIONS

Extended European Search Report for EP application No. 16202064.8 dated Mar. 6, 2017.

*Primary Examiner* — Zeev V Kitov
(74) *Attorney, Agent, or Firm* — Cantor Colburn LLP

(57) ABSTRACT

A method of containing arc faults in a power distribution unit includes in response to a bus bar temperature exceeding a bus bar temperature threshold, thermally opening a conductive element extending between an energizing coil of a contactor, a bus bar, and a controller. The controller is configured to selectively open and close the contactor. The conductive element is electrically connected to the energizing coil of the contactor and the controller. The conductive element is electrically isolated from a power source electrically connected to the first bus bar through the contactor.

16 Claims, 5 Drawing Sheets

(56) References Cited

U.S. PATENT DOCUMENTS

| | | |
|---|---|---|
| 9,112,336 B2 | 8/2015 | Samuelson |
| 9,812,853 B2 * | 11/2017 | Vasquez ............... H02H 1/0007 |
| 2007/0227754 A1 | 10/2007 | McEvatt |
| 2012/0014039 A1 * | 1/2012 | Keegan ................ H05K 7/1432 |
| | | 361/601 |
| 2017/0072905 A1 * | 3/2017 | Stimson ................ B60R 25/045 |

* cited by examiner

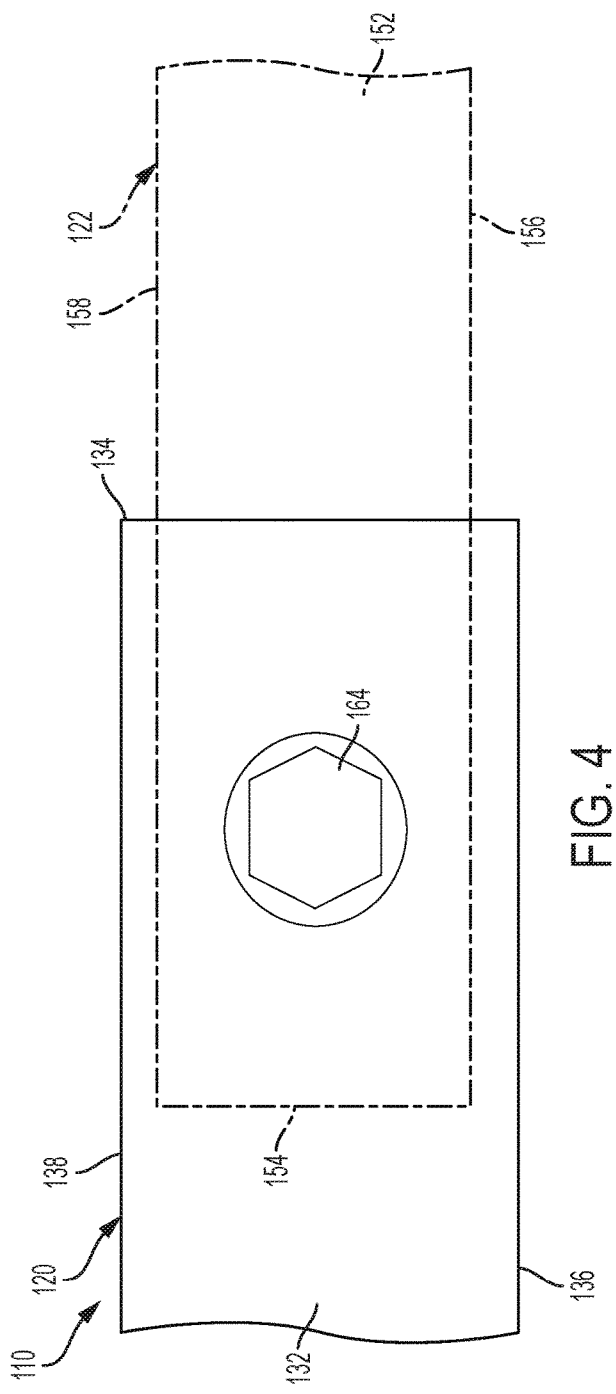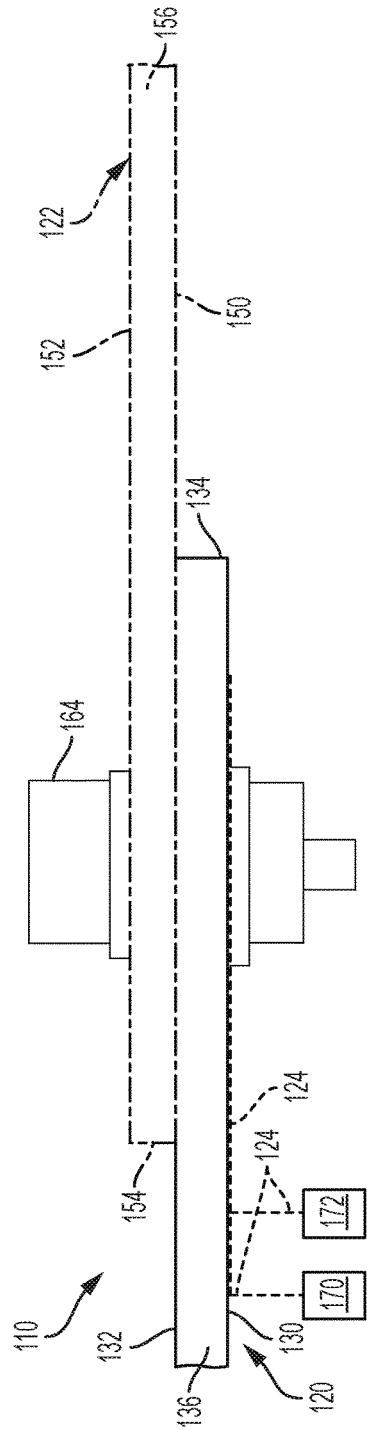

POWER DISTRIBUTION UNIT AND METHOD OF CONTAINING ARC FAULTS IN POWER DISTRIBUTION UNITS

BACKGROUND

The present disclosure relates to a method of containing arc faults in a power distribution unit and a power distribution unit.

Modern aircraft include power distribution units to distribute power to meet varying power requirements of multiple electrical systems and electrical subsystems. The power distribution units may include bus bars having electromechanical contactors to form electrical connections between a power source and a component of the electrical system or electrical subsystem. The bus bars are covered with an insulating coating to reduce the likelihood of electrical events, such as arcing.

SUMMARY

In an embodiment of the present disclosure, a method of containing arc faults in a power distribution unit is provided. The method includes, in response to a bus bar temperature exceeding a bus bar temperature threshold, thermally opening a conductive element. The conductive element extends between an energizing coil of a contactor, a bus bar, and a controller configured to selectively open and close the contactor. The conductive element is electrically connected to the energizing coil of the contactor and the controller. The conductive element is electrically isolated from a power source electrically connected to the first bus bar through the contactor.

In another embodiment of the present disclosure a power distribution unit is provided. The power distribution unit includes a first bus bar, a first contactor, and a first thermal sensor. The first contactor is connected to an output of a first power source and an input of a first bus bar. The first thermal sensor is in communication with a controller configured to selectively open and close the first contactor. The first controller commands the first contactor to open in response to a first thermal sensor signal indicative of a temperature of the first bus bar exceeding a temperature threshold.

In yet another embodiment of the present disclosure a power distribution unit is provided. The power distribution unit includes a first bus bar, a second bus bar, and a conductive element. The first bus bar having a first surface and a second surface is disposed opposite the first surface. The second bus bar having a third surface and a fourth surface disposed opposite the third surface. The second surface of the first bus bar abuts the third surface of the second bus bar. The second bus bar is operatively coupled to the first bus bar by a fastener. The conductive element is disposed on the first surface proximate the fastener. The conductive element is connected to a first energizing coil of a first contactor and a controller. The first conductive element opens in response to a temperature of the first bus bar exceeding a first temperature threshold.

BRIEF DESCRIPTION OF THE DRAWINGS

The following descriptions should not be considered limiting in any way. With reference to the accompanying drawings, like elements are numbered alike:

FIG. 4 is a top view of a fourth embodiment of first and second bus bars;

FIG. 5 is a side view of the fourth embodiment of first and second bus bars.

DETAILED DESCRIPTION

A detailed description of one or more embodiments of the disclosed apparatus and method are presented herein by way of examples and not limitation with reference to the Figures. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
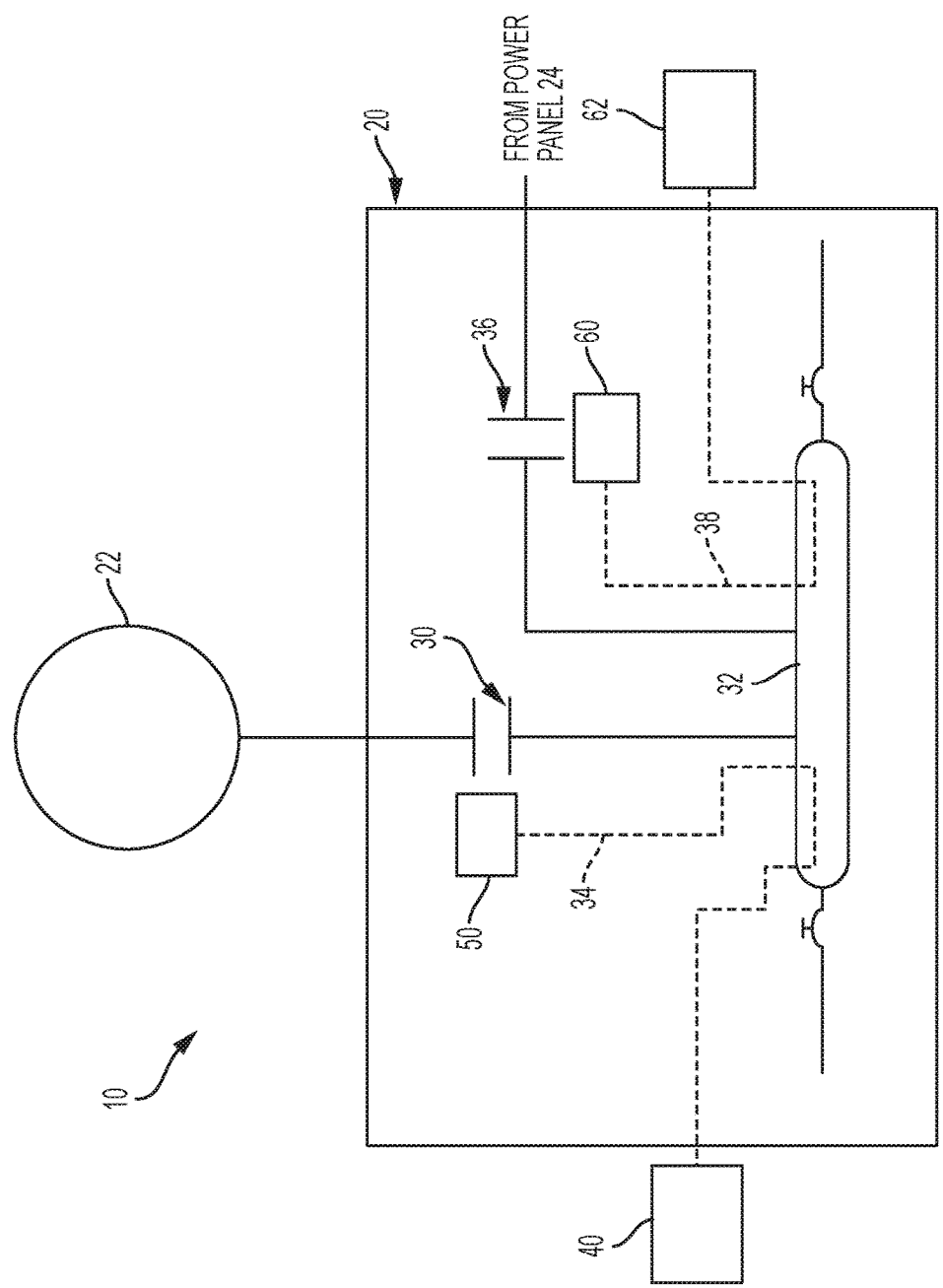
FIG. 1 is a schematic of a first embodiment of a power distribution unit.

FIG. 1 illustrates a first embodiment of a power distribution unit 10 having arc fault containment protection. The power distribution unit 10 includes a first power panel 20 that receives electrical power from a first power source 22. The first power panel 20 is connected to a second power panel 24 that receives electrical power from a second power source. The first power panel 20 and the second power panel 24 are isolated from each other during normal operation but may be connected through contactors should either power source be unable to source power to one of the power panels. The first power source 22 and the second power source may be DC electric power sources, AC electric power sources, or multi-phase power sources. The first power panel 20 includes a first contactor 30, a first bus bar 32, a first conductive element 34, a second contactor 36, and a second conductive element 38.

The first contactor 30 is connected to an output of the first power source 22. The first contactor 30 is connected to the first bus bar 32. The first contactor 30 is typically an electromechanical contactor that opens or closes under command from a controller 40 to inhibit or permit voltage or electrical power to be provided from the first power source 22 to the first bus bar 32. The output of the controller 40 controls a first energizing coil or first contactor coil 50 of the first contactor 30 to electrically hold the first energizing coil or first contactor coil 50 in an open or closed position. The first energizing coil or first contactor coil 50 of the first contactor 30 is held in an open position when electrical power is not provided to the first energizing coil or first contactor coil 50 of the first contactor 30 by the controller 40. The first energizing coil or first contactor coil 50 of the first contactor 30 is held in a closed position when electrical power is provided to the first energizing coil or first contactor coil 50 of the first contactor 30 by the controller 40.

If there is a fault that overheats the first bus bar 32, the first conductive element 34 interrupts electrical power provided to the first energizing coil or first contactor coil 50 of the first contactor 30 by the controller 40 to open the first contactor 30. With a fault that overheats the first bus bar 32, the second conductive element 38 will interrupt the electrical path provided to the second energizing coil or second contactor coil 60 of the second contactor 36 from controller 62. This will prevent controller 62 from closing the second contactor 36 such that power is not provided by the power source of the second power panel 24 to faulted bus bar 32.

The selective application of electrical power to the first energizing coil or first contactor coil 50 selectively opens and/or closes the first contactor 30 to permit or inhibit a flow of current or electrical power to the first bus bar 32. The first energizing coil or first contactor coil 50 is de-energized to open or close the first contactor 30. In at least one embodiment, the first contactor 30 includes a solid-state switch that selectively permits a flow of current or electrical power to the first bus bar 32.

The first bus bar 32 receives voltage or electrical power from the first power source 22 and/or the second power source of the second power panel 24 and supplies voltage or electrical power to an electrical component that interfaces with the power distribution unit 10. The first bus bar 32 is at least one of a DC bus bar, a single phase AC bus bar, and a multi-phase AC bus bar.

The first conductive element 34 is electrically connected to the first energizer coil or first contactor coil 50 of the first contactor 30 and the controller 40. The first conductive element 34 is thermally coupled to the first bus bar 32. The first conductive element 34 is electrically isolated from the first bus bar 32.

The first conductive element 34 is at least one of a conductor, a conductor ribbon, and a thermal fuse. The first conductive element 34 is configured to thermally open in response to a temperature of the first bus bar 32 increasing to or exceeding a first bus bar temperature threshold. The temperature of the first bus bar 32 increases in response to a thermal runaway condition such as excess current being provided to the first bus bar 32 or the breakdown of the thermal insulation of the first bus bar 32.

Bus bars typically have an operating temperature within the range of 150° C. to 175° C. Copper bus bars typically melt at approximately 1085° C. Aluminum bus bars typically melt at approximately 660° C. As such, the first conductive element 34 is configured to thermally open or melt at a temperature between 175° C. and 660° C. The first conductive element 34 thermal opening temperature or melting temperature may be adjusted to provide appropriate thermal margin and response time. For example, the thickness or gauge and the material selection of the first conductive element 34 are selected based on the thermal margin and response time to inhibit potential damage to at least one of the first power panel 20 and the second power panel 24.

The thermal opening of the first conductive element 34 results in the first conductive element 34 mechanically breaking to interrupt the delivery of electrical power from the first power source 22 to the first bus bar 32. The thermal opening of the first conductive element 34 interrupts the delivery of electrical power from the controller 40 to the first energizing coil or first contactor coil 50 of the first contactor 30 such that the first contactor 30 opens. In at least one embodiment, the first energizing coil or first contactor coil 50 of the first contactor 30 is in communication with a separate power source such that the first power source 22 is an AC source and the separate power source is a DC source or vice versa. In such mixed power applications, the voltage supplied to the first energizing coil or first contactor coil 50 of the first contactor 30 and the voltage of the first power source 22 that is being monitored are not compatible.

Figure 2:
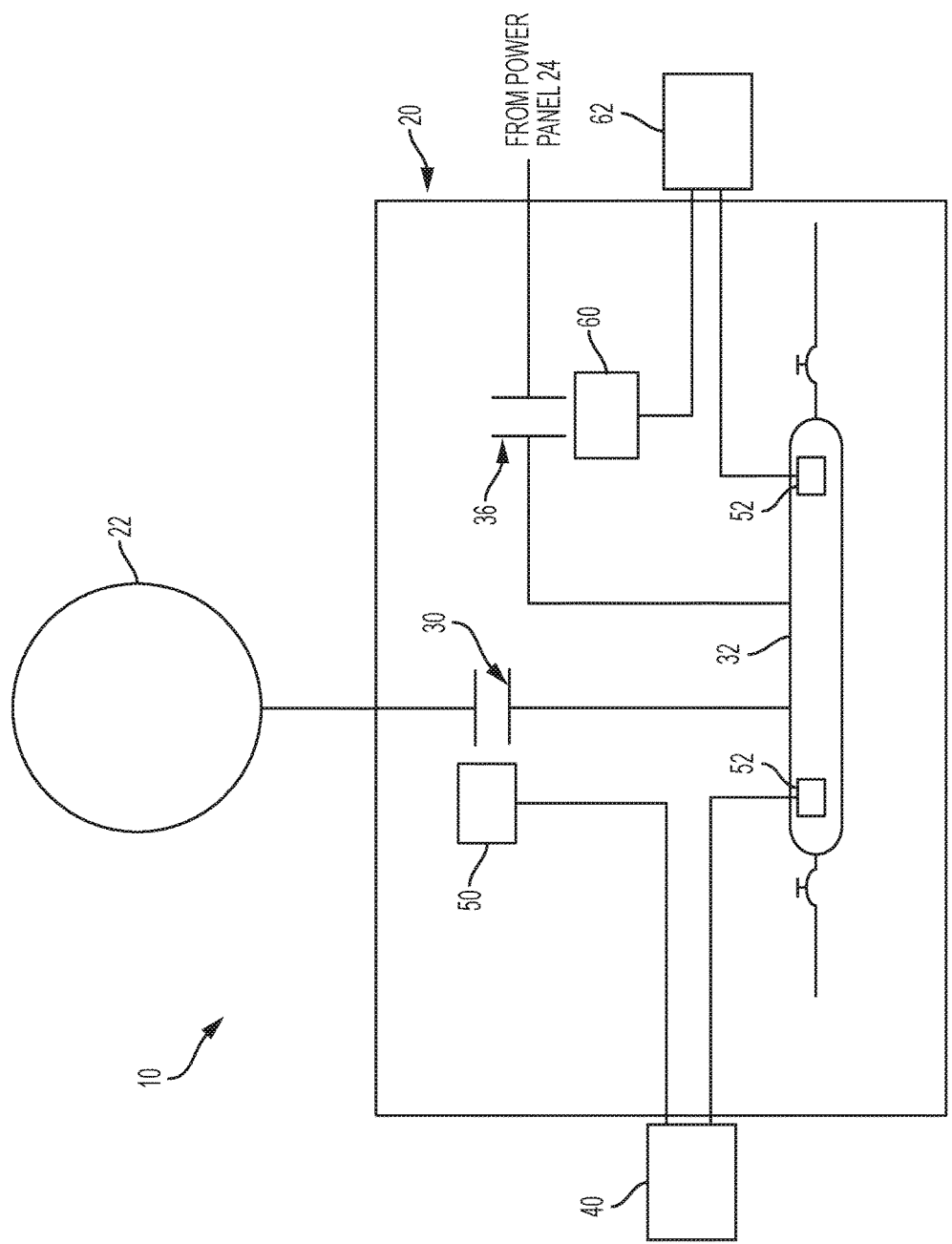
FIG. 2 is a schematic of a second embodiment of a power distribution unit.

In the second embodiment of the power distribution unit 10, as shown in FIG. 2, a thermal sensor 52 is disposed proximate the first bus bar 32 The thermal sensor 52 is in communication with a controller 40. The thermal sensor 52 is configured to provide a signal indicative of a temperature of the first bus bar 32 to the controller 40. The controller 40 is also in communication with the first energizing coil or first contactor coil 50 of the first contactor 30. In response to a signal indicative of the temperature of the first bus bar 32 exceeding a threshold temperature, the controller 40 interrupts power delivery to the first energizing coil or first contactor coil 50 of the first contactor 30 to open the first contactor 30 and interrupt the delivery of electrical power from the first power source 22 to the first bus bar 32.

Referring back to FIG. 1, the second contactor 36 is connected the first bus bar 32 and to the second power panel 24. The second contactor 36 is typically an electromechanical contactor that opens or closes under command from the controller 62 to inhibit or permit voltage or electrical power to be provided from the first power source 22 and/or the second power source to the first bus bar 32.

The second contactor 36 includes a second energizing coil or second contactor coil 60. The selective application of electrical power from a second controller 62 to the second energizing coil or second contactor coil 60 selectively opens and/or closes the second contactor 36 to permit or inhibit a flow of current or electrical power to/from the first bus bar 32. In at least one embodiment, controller 40 is connected to and controls both of the first contactor 30 and the second contactor 36.

The second energizing coil or second contactor coil 60 is de-energized to open or close the second contactor 36. In at least one embodiment, the second contactor 36 includes a solid-state switch that selectively permits a flow of current or electrical power to/from the second bus bar of the second power panel 24.

The second contactor 36 enables the first bus bar 32 to selectively receive voltage or electrical power from a second power source of the second power panel 24. The second contactor 36 enables the first power panel 20 to supply voltage or electrical power to the second power panel 24 having a second bus bar. The second bus bar of the second power panel 24 is at least one of a DC bus bar, a single phase AC bus bar, and a multi-phase AC bus bar.

The second conductive element 38 is electrically connected to the second energizing coil or second contactor coil 60 of the second contactor 36 and to the controller 62 The second conductive element 38 is thermally coupled to the first bus bar 32. The second conductive element 38 is electrically isolated from the first bus bar 32.

The second conductive element 38 is at least one of a conductor, a conductor ribbon, and a thermal fuse. The second conductive element 38 is configured to thermally open in response to a temperature of the first bus bar 32 exceeding the first bus bar temperature threshold. The temperature of the first bus bar 32 increases in response to a thermal runaway condition where excess current is provided to the first bus bar 32 or the breakdown of the thermal insulation of the first bus bar 32.

The thermal opening of the second conductive element 38 results in the second conductive element 38 mechanically breaking to interrupt the delivery of electrical power from the first power source 22 to the second power panel 24 or from the second power panel 24 to the first bus bar 32 of the first power panel 20. The thermal opening of the second conductive element 38 interrupts the delivery of electrical power from the second controller 62 or the controller 40 to the second energizing coil or second contactor coil 60 of the second contactor 36 such that the second contactor 36 opens.

The thermal opening temperature of the second conductive element 38 may be adjusted to provide appropriate thermal margin and response time. For example, the thickness or gauge and the material selection of the second conductive element 38 are selected based on the thermal margin and response time.

In at least one embodiment, the second energizing coil or second contactor coil 60 of the second contactor 36 may be in communication with a separate power source such that the second power source of the second power panel 24 is an AC source and the separate power source is a DC source or vice versa. In such mixed power applications, the voltage supplied to the energizing coil or contactor coil of the second contactor 36 and the voltage of the second power source 26 that is being monitored are not compatible.

In the second embodiment shown in FIG. 2, a pair of thermal sensors 52 are disposed proximate the first bus bar 32. One thermal sensor 52 is in communication with the controller 40 that is in communication with the first energizing coil or first contactor coil 50 of the first contactor 30 and another thermal sensor is in communication with the second controller 62 that is in communication with the second energizing coil or second contactor coil 60 of the second contactor 36. The pair of thermal sensors 52 are configured to provide a signal indicative of a temperature of the first bus bar 32 to their respective controllers. In response to a signal indicative of the temperature of the first bus bar 32 exceeding a threshold temperature, the second controller 62 interrupts power delivery to the second energizing coil or second contactor coil 60 of the second contactor 36 to open the second contactor 36 and interrupt the delivery of electrical power from the first power source 22 or the power source of the second power panel 24 to the first bus bar 32.

Figure 3:
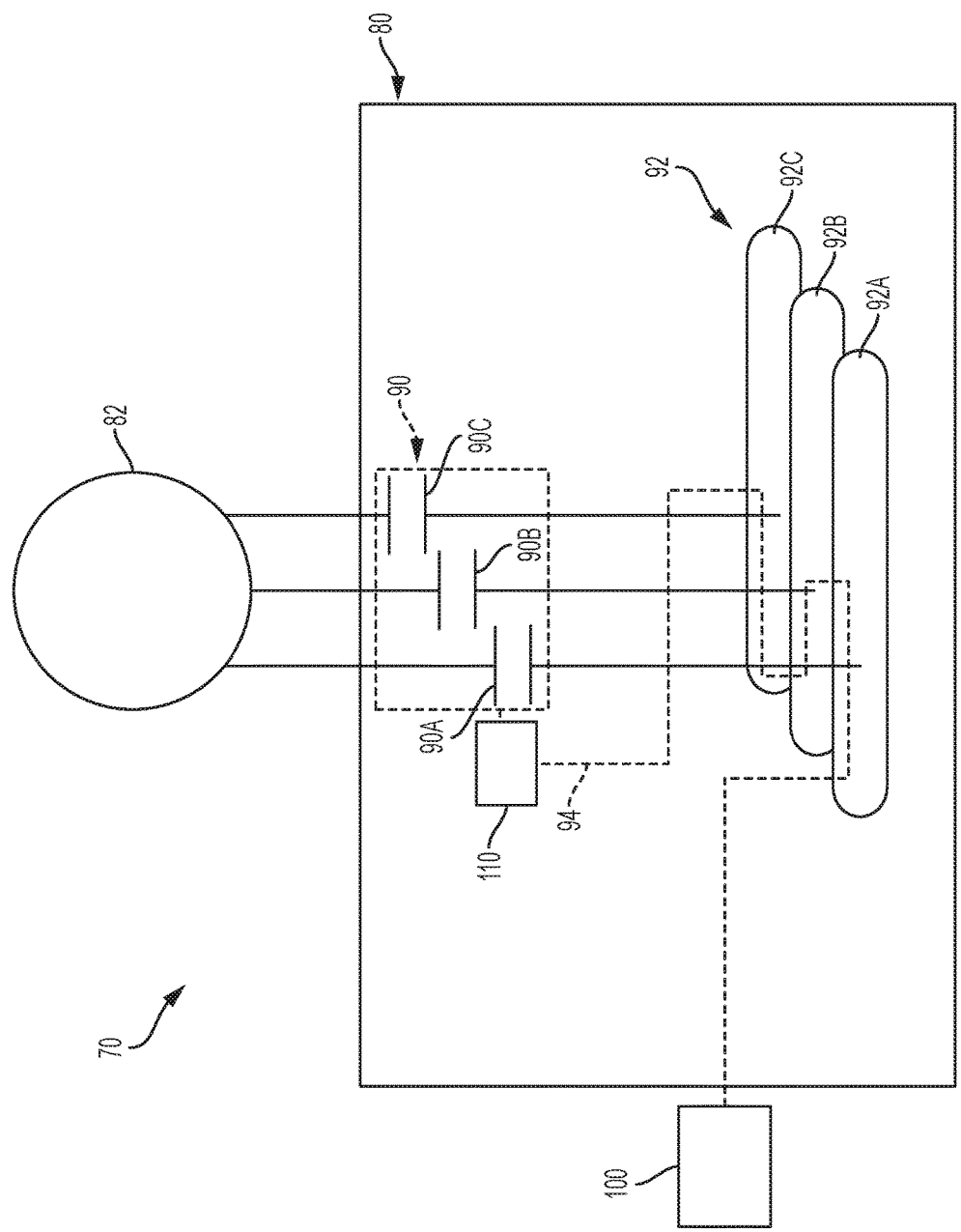
FIG. 3 is a schematic view of a third embodiment of a power distribution unit.

Referring to FIG. 3, a multi-phase power distribution unit 70 is shown. The multi-phase power distribution unit 70 includes a multi-phase power panel 80 that receives electrical power a multi-phase power source 82. The multi-phase power panel 80 includes a multi-phase contactor assembly 90, a multi-phase bus bar assembly 92, and a multi-phase thermally conductive element 94. A first contactor 90A, a second contactor 90B, and a third contactor 90B are members of the multi-phase contactor assembly 90. A first bus bar 92A, a second bus 92B, and a third bus bar 92C are members of the multi-phase bus bar assembly 92. In such an arrangement, the multi-phase thermally conductive element 94 is connected to the multi-phase contactor assembly 90, multi-phase bus bar assembly 92, and a controller 100. The multi-phase thermally conductive element 94 is daisy chained across all elements of the multi-phase contactor assembly 90.

The multi-phase thermally conductive element 94 is configured to thermally open in response to a temperature of any bus bar (i.e. 92A, 92B, 92C) of the multi-phase bus bar assembly 92 exceeding a bus bar temperature threshold. The thermal opening of the multi-phase thermally conductive element 94 interrupts delivery of voltage or electrical power from the controller 100 to energizing coils or contactor coils 110 of the multi-phase contactor assembly 90, the controller 100 commands that all of the contactors of the multi-phase contactor assembly 90 open. The thermal opening of the multi-phase thermally conductive element 94 interrupts the delivery of voltage or electrical power from the multi-phase power source 82 to the multi-phase bus bar assembly 92.

FIGS. 4 and 5 illustrate a fourth embodiment of a power distribution unit 110 having arc fault containment protection for bus bars coupled in series. The power distribution unit 110 includes a first bus bar 120, a second bus bar 122, and a conductive element 124.

The first bus bar 120 includes a first surface 130, a second surface 132, a first end surface 134, a first side surface 136, and a second side surface 138. The first surface 130 forms an exterior surface of the first bus bar 120. The second surface 132 is disposed opposite the first surface 130. The second surface 132 is disposed substantially parallel to the first surface 130. The first bus bar 120 has a thickness that extends from the first surface 130 to the second surface 132.

The first end surface 134 extends from the first surface 130 to the second surface 132. The first end surface 134 extends from the first side surface 136 to the second side surface 138.

The first side surface 136 is disposed opposite the second side surface 138. The first side surface 136 extends from the first surface 130 to the second surface 132. The first side surface 136 is disposed substantially perpendicular to the first surface 130 and/or the second surface 132. The first side surface 136 and the second side surface 138 are disposed substantially parallel to each other.

The second bus bar 122 includes a third surface 150, a fourth surface 152, a third end surface 154, a third side surface 156, and a fourth side surface 158. The fourth surface 152 is disposed opposite the third surface 150. The fourth surface 152 is disposed substantially parallel to the third surface 150. The second bus bar 122 has a thickness that extends from the third surface 150 to the fourth surface 152.

The third end surface 154 extends from the third surface 150 to the fourth surface 152. The third end surface 154 extends from the third side surface 156 to the fourth side surface 158.

The third side surface 156 is disposed opposite the fourth side surface 158. The third side surface 156 extends from the third surface 150 to the fourth surface 152. The third side surface 156 is disposed substantially perpendicular to the third surface 150 and/or the fourth surface 152. The third side surface 156 and the fourth side surface 158 are disposed substantially parallel to each other.

The second surface 132 of the first bus bar 120 abuts the third surface 150 of the second bus bar 122. The first bus bar 120 is coupled to the second bus bar 122 by a fastener 164. The fastener 164 extends completely through the first bus bar 120 and the second bus bar 122 such that the first bus bar 120 and the second bus bar 122 are coupled to each other via a bolted joint.

The conductive element 124 is disposed on a surface of the either the first bus bar 120 or the second bus bar 122 that is visible for inspection. In the embodiment shown, the first surface 130 of the first bus bar 120 is visible for inspection. The conductive element 124 is disposed on the first surface 130 of the first bus bar 120. The conductive element 124 is disposed proximate a nut or washer of the fastener 164. The conductive element 124 is connected to an energizing coil or contactor coil of a contactor 170 and is connected to a controller 172. The conductive element 124 is thermally coupled to the first bus bar 120. The conductive element 124 is electrically isolated from the first bus bar 120. The thermal opening of the conductive element 124 interrupts the delivery of power from the controller 172 to the energizing coil or contactor coil of the contactor 170 such that the contactor 170 opens.

The conductive element 124 is made of an alloy configured to thermally open. The conductive element 124 is configured to thermally open in response to a temperature of the second bus bar 122 exceeding a second bus bar temperature threshold.

In at least one embodiment, at least one thermal sensor 52 is disposed proximate the fastener 164. The thermal sensor 52 may be provided in addition to the conductive element 124 or instead of the conductive element 124. The thermal sensor 52 is in communication with a controller that is configured to selectively open and close the contactor 170. The controller commands the contactor 170 to open in response to a thermal sensor signal indicative of a temperature of at least one of the first bus bar 120 and the second bus bar 122 exceeding a temperature threshold.

Figure 6:
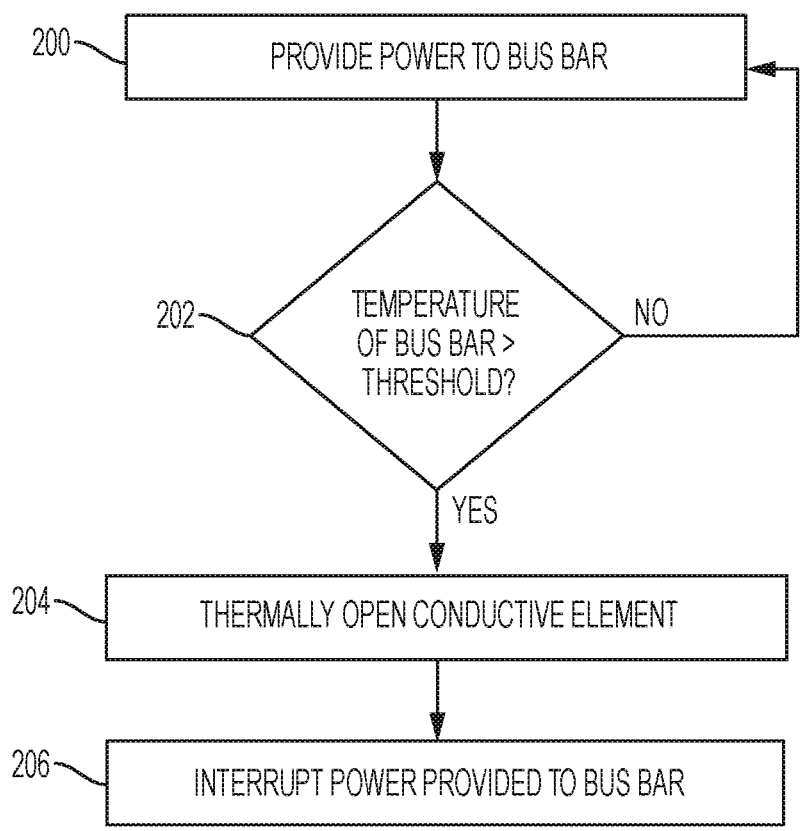
FIG. 6 is a flowchart of a method of containing arc faults in a power distribution unit.

FIG. 6 illustrates a method of containing arc faults and a power distribution unit. The power distribution unit includes a conductive element, a bus bar, and a contactor having an energizing coil or contactor coil. The conductive element is thermally coupled to the bus bar. The conductive element is electrically isolated from the bus bar. At block 200, a power source is providing voltage or electrical power to the bus bar.

At block 202, the method determines if a temperature of the bus bar exceeds a bus bar temperature threshold. If the temperature of the bus bar exceeds a bus bar temperature threshold the conductive element thermally opens at block 204. The opening of the conductive element indicates that the temperature of the bus bar has exceeded the bus bar temperature threshold. In at least one embodiment, the bus bar temperature may be determined by a temperature sensor disposed proximate the bus bar or the conductive element.

At block 206, the method interrupts power provided to the bus bar from the power source. The power is interrupted by opening the contactor by de-energizing the energizing coil or contactor coil of the contactor.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of containing arc faults in a power distribution unit, the method comprising:
    in response to a bus bar temperature exceeding a bus bar temperature threshold, thermally opening a conductive element extending between an energizing coil of a contactor, a bus bar, and a controller configured to selectively open and close the contactor, the conductive element being electrically connected to the energizing coil of the contactor and the controller, the conductive element being electrically isolated from a power source electrically connected to the bus bar through the contactor, the conductive element being disposed on a surface of the bus bar and being electrically isolated from the bus bar.

2. The method of claim 1, wherein the conductive element is thermally coupled to the bus bar.

3. The method of claim 1, wherein opening the conductive element comprises de-energizing the energizing coil of the contactor and opening the contactor.

4. The method of claim 1, further comprising interrupting power provided to the bus bar from the power source.

5. The method of claim 1, wherein the conductive element is coupled in series with the energizing coil of the contactor and the controller.

6. The method of claim 1, wherein the conductive element is at least one of a conductor, a conductor ribbon, and a thermal fuse.

7. The power distribution unit of claim 1, wherein the first contactor includes a solid-state switch.

8. The power distribution unit of claim 1, wherein the first controller command to open the first contactor includes interrupting power provided to a first energizing coil of the first contactor from the controller.

9. A power distribution unit having arc fault containment protection, comprising:
    a first bus bar;
    a first contactor being connected to an output of a first power source and being connected to an input of the first bus bar;
    a first thermal sensor in communication with a controller configured to selectively open and close the first contactor, wherein in response to a first thermal sensor signal indicative of a temperature of the first bus bar exceeding a temperature threshold, the controller commands the first contactor to open;
    a second contactor being connected to the input of the first bus bar and being connected to a second power panel; and
    a second thermal sensor in communication with a second controller configured to selectively open and close the second contactor, wherein in response to a second thermal sensor signal indicative of a temperature of the first bus bar exceeding the temperature threshold, the second controller commands the second contactor to open.

10. The power distribution unit of claim 9, wherein the second contactor includes a solid-state switch.

11. The power distribution unit of claim 9, wherein the second controller command to open the second contactor includes interrupting power provided to a second energizing coil of the second contactor from the second controller.

12. The power distribution unit of claim 9, wherein the first bus bar is a member of a multi-phase bus bar assembly connected to respective a multi-phase power source.

13. The power distribution unit of claim 10, wherein the first contactor is a member of a multi-phase contactor assembly connected to a multi-phase bus bar assembly.

14. The power distribution unit of claim 13, wherein in response to a temperature of any bus bar of the multi-phase bus bar assembly exceeding a bus bar temperature threshold, each member of the multi-phase contactor assembly opens.

15. A power distribution unit having arc fault containment protection, comprising:
    a first bus bar having a first surface and a second surface disposed opposite the first surface;
    a second bus bar having a third surface and a fourth surface disposed opposite the third surface, the second surface of the first bus bar abuts the third surface of the second bus bar, the second bus bar being operatively coupled to the first bus bar by a fastener; and
    a conductive element being disposed on the first surface proximate the fastener, the conductive element being connected to a contactor and a controller, in response to a temperature of the first bus bar exceeding a first temperature threshold, the conductive element opens and delivery of power to the controller is interrupted such that the contactor opens.

16. The power distribution unit of claim 15, further comprising a thermal sensor disposed proximate the fastener, the thermal sensor in communication with a controller operatively connected to a contactor, wherein in response to a temperature sensor signal indicative of a temperature of the first bus bar exceeding a temperature threshold, the controller commands the contactor to open.

\* \* \* \* \*